United States Patent
Uslu

(10) Patent No.: US 12,259,102 B2
(45) Date of Patent: Mar. 25, 2025

(54) COATING STRUCTURE FOR COATING A REFLECTOR FOR USE IN A HEADLIGHT OF A MOTOR VEHICLE

(71) Applicant: Hella GmbH & Co. KGaA, Lippstadt (DE)

(72) Inventor: Fahri Uslu, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 61 days.

(21) Appl. No.: 18/454,528

(22) Filed: Aug. 23, 2023

(65) Prior Publication Data
US 2024/0068639 A1    Feb. 29, 2024

(30) Foreign Application Priority Data
Aug. 24, 2022    (DE) .......................... 102022121363.3

(51) Int. Cl.
| | |
|---|---|
| F21V 7/28 | (2018.01) |
| F21S 41/37 | (2018.01) |
| F21V 7/24 | (2018.01) |
| G02B 5/08 | (2006.01) |

(52) U.S. Cl.
CPC ................ F21S 41/37 (2018.01); F21V 7/24 (2018.02); F21V 7/28 (2018.02); G02B 5/0875 (2013.01)

(58) Field of Classification Search
CPC ..................................... F21V 7/24; F21V 7/28
See application file for complete search history.

(56) References Cited

U.S. PATENT DOCUMENTS

| | | |
|---|---|---|
| 2005/0063067 A1 | 3/2005 | Phillips et al. |
| 2020/0041694 A1 | 2/2020 | Yoshida |

FOREIGN PATENT DOCUMENTS

| | | | |
|---|---|---|---|
| DE | 60213593 T2 | 9/2006 | |
| JP | 09265951 A | 10/1997 | |
| WO | WO-2018047865 A1 * | 3/2018 | ............. B32B 15/04 |

* cited by examiner

Primary Examiner — Robert J May
(74) Attorney, Agent, or Firm — Husch Blackwell LLP

(57) ABSTRACT

A coating structure is provided for coating a reflector for use in a headlamp of a motor vehicle. The coating structure includes a metallic base layer for applying to a substrate which may be a reflective base body. A layer of polytetrafluoroethylene is arranged on the metallic base layer. At least one high-refractive index dielectric layer (H) with a refractive index of ≥1.8 in the visible spectral range arranged on the layer of polytetrafluoroethylene. The material of the high-refractive index dielectric layer (H) does not feature any absorption lines in the visible spectral range.

19 Claims, 5 Drawing Sheets

COATING STRUCTURE FOR COATING A REFLECTOR FOR USE IN A HEADLIGHT OF A MOTOR VEHICLE

CROSS REFERENCE

This application claims priority to German Application No. 10 2022 121363.3, filed Aug. 24, 2022, the entirety of which is hereby incorporated by reference.

FIELD OF THE INVENTION

The invention relates to a coating structure for coating a reflector for use in a headlamp of a motor vehicle, a system comprising such a coating structure and a reflector, comprising such a coating structure. Furthermore, the invention relates to a motor vehicle with a headlamp, comprising an inventive coating structure as well as a method for producing such a coating structure.

BACKGROUND OF THE INVENTION

In modern headlamp systems, the requirements placed on the achievable light intensity are constantly increasing. To meet the increasing requirements, one known solution is to increase the number of light sources used in a headlamp. As a disadvantage, both from the perspective of energy technology and costs as well as for reasons of thermal management, the use of additional light sources does not constitute an appropriate means of increasing the achievable light intensity of a headlamp.

One further possibility to increase the light intensity in headlamps is to increase the reflectivity in the headlamp reflector system, which can be optimized in particular through the selection of the reflector material used. The potential for optimization through varying the reflector material is limited, however, and in the present case cannot be increased to a reflectivity of >94% in the visible spectral range.

BRIEF SUMMARY OF THE INVENTION

Consequently, one task of the present invention is to at least partially remedy the aforementioned disadvantages known from the current state of technology. In particular, one task of the present invention is to increase in a simple and cost-effective manner the light intensity achievable by means of a headlamp.

Additional features and details of the invention can be found in the respective subclaims, description and drawings. In this context, the features and details that are described in connection with the inventive coating structure also apply in connection with the inventive system, or the inventive reflector or the inventive motor vehicle or the inventive method.

According to a first aspect of the invention, a coating structure for coating a reflector for use in a headlamp of a motor vehicle is provided for. The inventive coating structure comprises a metallic base layer for applying to a substrate, preferentially for applying to a reflective base body, a layer of fluorocarbon arranged on the metallic base layer and at least one high-refractive index dielectric layer with a refractive index of 1.8 in the visible spectral range arranged on the layer of fluorocarbon, where the material of the high-refractive index dielectric layer does not feature any absorption lines in the visible spectral range. The fluorocarbon or the layer of fluorocarbon can preferentially can be fashioned from at least one of the following fluorocarbons: PTFE (polytetrafluorethylene), FEP (fluorinated ethylene propylene) or $CF_4$ (tetrafluoromethane).

The inventive coating structure can be used in particular in the headlamps of passenger cars or trucks. Furthermore, use of the coating structure is conceivable in the headlamps for excavators, fork lift trucks or boats, or similar. Within the scope of the invention, a coating structure can be understood to be in particular a structure made of several layers that can be applied to a substrate. Furthermore, a metallic base layer can furthermore be understood to be a first layer of a metal applied directly to the substrate. Over and above this, a substrate can be understood to be preferentially a carrier or a base body, in particular a reflective base body. Within the context of the invention, a high-refractive index dielectric layer can be understood to be preferentially a layer with a refractive index of ≥1.8 in the visible spectral range, where the visible spectral range is deemed preferentially to be the wave length range from 380 nm to 780 nm and the refractive index of a layer in the visible spectral range is deemed to be the refractive index averaged over this range, in particular in the case of standard conditions, such as room temperature, atmospheric pressure and air humidity under standard atmospheric conditions. It is understood that, under the characteristic of not featuring absorption lines in the visible spectral range, minor deviations can be included, for example absorption lines in the visible spectral range that cumulated can lead to a relative absorption in the visible spectral range of up to 2% (transmittivity of 98%). In a way similar to how the metallic base layer can be arranged directly on the substrate, in the present case the layer of fluorocarbon can also be applied or arranged on the metallic base layer and/or the high-refractive index dielectric layer directly on the layer of fluorocarbon.

Through the combination provided for by the invention of a metallic base layer, layer of fluorocarbon arranged on the metallic base layer, and a high-refractive index dielectric layer with a refractive index of ≥1.8 in the visible spectral range arranged on the layer of fluorocarbon, it is possible in particular in a simple and cost-effective manner to maximize the reflectivity of a reflector body onto which the coating structure is applied in the present case and by doing so increase the achievable light intensity of a headlamp featuring such a reflector body. Though the combination of the high-refractive index dielectric layer with a refractive index of ≥1.8 in the visible spectral range and the layer of fluorocarbon that are preferentially arranged directly adjacent to each other, it is possible on the basis of the interference effect as a function of the refractive index of the high-refractive index dielectric layer and the layer thickness of the layer to maximize the reflectivity of a reflector body on which the coating structure in the present case is applied. Furthermore, the layer of fluorocarbon can additionally act as corrosion protection for the metallic base layer.

One advantageous option is for the metallic base layer of aluminum, copper, silver and/or iron, which ensures not only a higher level of reflectivity but also simple processing and a stable arrangement. For reasons of reflectivity and weight, aluminum in particular lends itself in this context as a suitable material for the base layer.

With regard to the possibility of a particularly effective increase in the reflectivity of a reflector base body when applying a coating structure to the base body in the present case, it can furthermore be provided that a plurality of high-refractive index dielectric layers and a plurality of low-refractive index dielectric layers with a refractive index of <1.8 in the visible spectral range of a material without absorption lines in the visible spectral range are arranged on the layer of fluorocarbon, where the high-refractive index dielectric layers and the low-refractive index dielectric layers are arranged on top of each other preferentially alternating. In doing so, the inventive coating structure can advantageously feature a coating structure of H/L/H/L/H/L . . . , where H stands for a high refractive index dielectric layer with a refractive index of ≥1.8 and L for a low refractive index refractive layer with a refractive index of <1.8 (likewise averaged across the visible spectral range).

Within the scope of simple, quick and cost-effective production of an inventive coating structure, one advantageous option in the present case is for at least one high-refractive index dielectric layer to take the form of a metal oxide, preferentially the form of $TiO_2$ or $Fe_2O_3$. As an alternative, at least one dielectric layer can be fashioned with a refractive index in the visible spectral range of ≥1.8 also in the form of a carbide, for example in the form of SiC.

In order to ensure an especially effective increase in the reflectivity of a reflector base body when applying a coating structure to the base body in the present case, it can furthermore be provided in the present case that a low refractive index dielectric layer with a refractive index in the visible spectral range of <1.8 can be fashioned in the form of fluorocarbon and/or hexamethyldisiloxane.

In the context of a strong layer cohesion, it further conceivable that a bonding layer is provided for improving bonding, where the bonding layer is arranged preferentially directly on the metallic layer, in particular for arranging between the substrate and the metal layer. In this way, it is possible in particular to ensure a stable arrangement of the coating structure on the substrate in the present case.

With regard to the potential of a significant increase in the light intensity of a headlamp when using the inventive coating structure in a headlamp, in particular on the reflector of a headlamp, it can be advantageously provided for the coating structure to feature a reflectivity in the visible spectral range of >94%, preferentially >95%, in particular >96%.

In the context of a particularly effective increase in the reflectivity of a reflective base body when applying a coating structure to the base body in the present case, it can in particular be provided for the layer thickness of the dielectric layers to be between 10 and 300 nm, preferentially between 50 and 150 nm. In doing so, the layer thickness can be selected in particular with regard to the materials used and their refractive indices in the optical spectral range.

In this respect, the invention can advantageously provide for the layer thickness of the dielectric layers to differ at least partially from each other, where the layer thickness of the high-refractive index dielectric layer is preferentially less than the layer thickness of the low-refractive index dielectric layer.

Within the scope of manufacturing a high-grade coating structure comprising small layer thicknesses of less than 300 nm and applying the coating structures even to complex base bodies the invention can advantageously provide for it to be possible for the coating structure to be manufactured at least in part by means of a vapor deposition method preferentially by means of a PVD or CVD method.

Another object of the invention is furthermore a system comprising a substrate and a coating structure arranged on the substrate. In this way, the inventive system has the same advantages as were already described in more detail in relation to the inventive coating structure.

Another object of the invention is furthermore a system comprising a substrate and a coating structure arranged on the substrate. According to the invention, the substrate can be advantageously fashioned from a plastic, preferentially from a thermoplastic, in particular from one of the following plastics: Polyamide, polyethylene, polycarbonate, polyoxymethylene, polyethylene terephthalate. In this way, the inventive system has the same advantages as were already described in more detail in relation to the inventive coating structure.

Another object of the invention is furthermore a reflector for use in a headlamp of a motor vehicle comprising a coating structure as described above. In this way, the inventive reflector has the same advantages as were already described in more detail in relation to the inventive coating structure or the inventive system.

Another object of the invention is furthermore a motor vehicle with a headlamp, comprising a coating structure as described above preferentially comprising a system as described above, in particular comprising a reflector as described above. In this way, the inventive motor vehicle has the same advantages as were already described in more detail in relation to the inventive coating structure or the inventive system or the inventive reflector.

Another object of the invention is furthermore a method for manufacturing an inventive coating structure. In this respect, the inventive method comprises the steps of applying a metallic base layer to a substrate, preferentially to a reflective base body, of applying a layer of fluorocarbon to the metallic base layer and of applying a high-refractive index dielectric layer with a refractive index of ≥1.8 in the visible spectral range of a material without absorption lines in the visible spectral range to the layer of fluorocarbon. In this way, the inventive method has the same advantages as were already described in more detail in relation to the inventive coating structure or the inventive system or the inventive reflector, or the inventive motor vehicle.

Within the scope of manufacturing a high-grade coating structure comprising small layer thicknesses of less than 300 nm and applying the coating structures even to complex base bodies the invention can advantageously provide for the application of the metallic base layer and/or the layer of fluorocarbon and/or the high-refractive index dielectric to be performed by means of a vapor deposition method, preferentially by means of a PVD or CVD method.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the following description regarding some sample embodiments of the invention, the identical reference numbers are also used for the same technical features in different sample embodiments.

Figure 1:
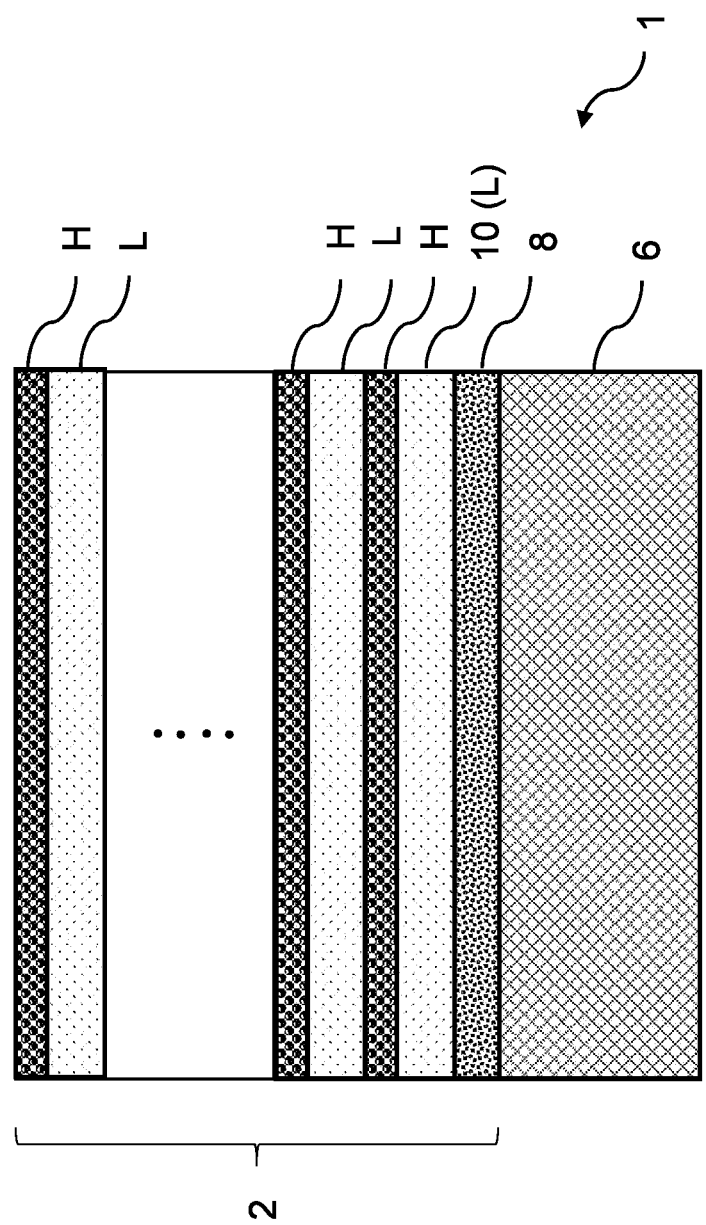
FIG. 1 is a schematic representation of an inventive system, comprising a substrate and an inventive coating structure arranged on the substrate according to a first sample embodiment.

FIG. 1 shows a schematic representation of an inventive system 1, comprising a substrate 6 and a coating structure 2 arranged on the substrate 6 for coating a reflector for use in a headlamp 20 of a motor vehicle 30 according to a first sample embodiment.

As can be seen from FIG. 1, the coating structure 2 comprises a metallic base layer 8 for application to the substrate 6, a layer 10 of fluorocarbon arranged directly on the metallic base layer 8, and a high-refractive index dielectric layer H with a refractive index of ≥1.8 in the visible spectral range arranged on the layer 10 of fluorocarbon, where the material of the high-refractive index dielectric layer (H) does not feature any absorption lines in the visible spectral range.

To be more precise, a plurality of high-refractive index dielectric layers H and a plurality of low-refractive index dielectric layers L with a refractive index of <1.8 in the visible spectral range of a material without absorption lines in the spectral range are arranged on the layer 10 of fluorocarbon in the present case, where the high-refractive index dielectric layers H and the low-refractive index dielectric layers L are arranged on top of each other preferentially alternating.

The metallic base layer 8 can be fashioned from aluminum, copper, silver or iron in the present case.

The high-refractive index dielectric layers H can furthermore take the form of a metal oxide. preferentially the form of $TiO_2$ or $Fe_2O_3$.

The low-refractive index dielectric layers L with a refractive index in the visible spectral range of <1.8 can preferentially take the form of polytetrafluoroethylene and/or hexamethyldisiloxane.

The layer thickness of the dielectric layers H, L can be for example between 10 and 300 nm, preferentially between 50 and 150 nm, where the layer thickness of the dielectric layers H, L differ at least partially from each other, where the layer thickness of the high-refractive index dielectric layer H is preferentially less than the layer thickness of the low-refractive index dielectric layer L.

With a coating structure 2 fashioned in the present case by means of a vapor deposition method, preferentially manufactured by means of a PVD or CVD method, it is in particular possible to achieve a reflectivity in the visible spectral range of >94%, preferentially of >95%, in particular of >96%.

Figure 2:
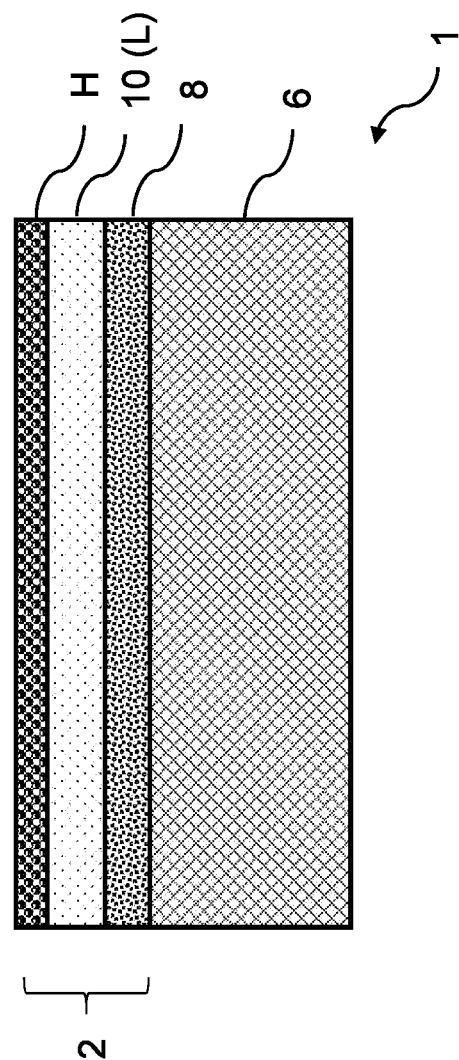
FIG. 2 is a schematic representation of an inventive system comprising a substrate and a coating structure arranged on the substrate according to a further sample embodiment.

FIG. 2. shows a schematic representation of an inventive system 1, comprising a substrate 6 and a coating structure 2 arranged on the substrate 6 according to a further sample embodiment.

As can be seen from FIG. 2, the coating structure 2 arranged on the substrate 6 comprises a mere three layers, a metallic base layer 8 of aluminum, a layer 10 of polytetrafluoroethylene arranged on the metallic base layer 8 and a high-refractive index dielectric layer H with a refractive index of ≥1.8 in the visible spectral range in the form of a $TiO_2$ layer arranged on the layer 10 of polytetrafluoroethylene.

Figure 3:
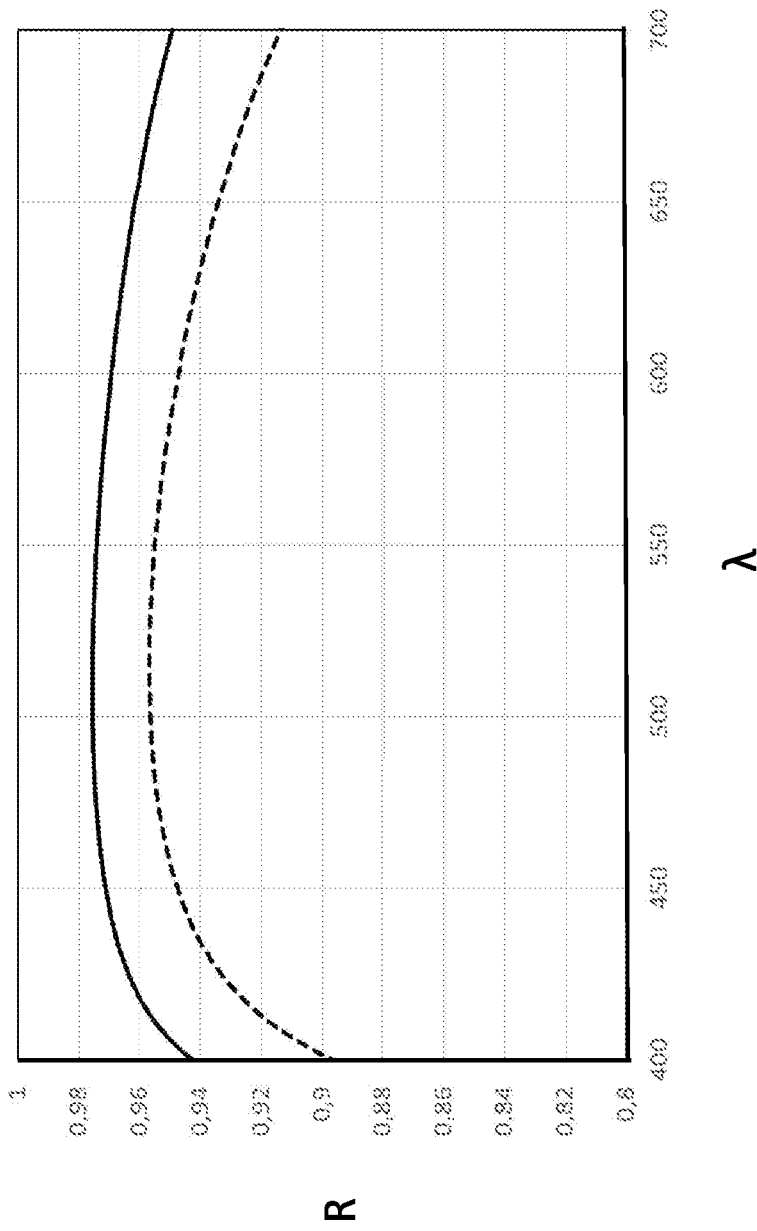
FIG. 3 is a schematic representation of application of the reflectivity in the visible spectral range for an inventive coating structure and a comparative coating structure.

FIG. 3 shows a schematic representation of an application of the reflectivity of an inventive coating structure 2 (solid line) and a comparative coating structure (dashed line) in the visible spectral range.

In this context, the inventive coating structure 2 comprises an aluminum base layer followed by a polytetrafluoroethylene layer and a high-refractive index dielectric layer H with a refractive index of ≥1.8 in the form of a $TiO_2$ layer. In contrast, the comparative coating structure comprises an aluminum base layer, followed by a hexamethyldisiloxane layer and a high-refractive index dielectric layer H with a refractive index of ≥1.8 in the form of a $TiO_2$ layer.

As can be seen from FIG. 3, the reflectivity of the inventive coating structure 2 is significantly higher over the entire visible spectral range than the reflectivity of the comparative coating structure and shows a maximum value of approximately 98% in contrast to a mere 96% maximum reflectivity of the comparative coating structure.

Figure 4:
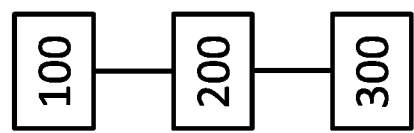
FIG. 4 is a schematic representation of the individual steps of an inventive method for manufacturing an inventive coating structure.

FIG. 4 shows a schematic representation of the individual steps of an inventive method for manufacturing an inventive coating structure 2.

As can be seen from FIG. 4, the inventive method comprises the steps of applying 100 a metallic base layer 8 to a substrate 6, preferentially to a reflective base body, of applying 200 a layer 10 of polytetrafluoroethylene to the metallic base layer 8 and of applying 300 a high-refractive index dielectric layer 12 with a refractive index of ≥1.8 in the visible spectral range of a material without absorption lines in the visible spectral range to the layer 10 of polytetrafluoroethylene.

The applying 100, 200, 300 of the metallic base layer 8 and/or the layer 10 of polytetrafluoroethylene and/or the high-refractive index dielectric layer 12 can be performed in the present case preferentially by means of a vapor deposition method, preferentially by means of a PVD or CVD method.

Figure 5:
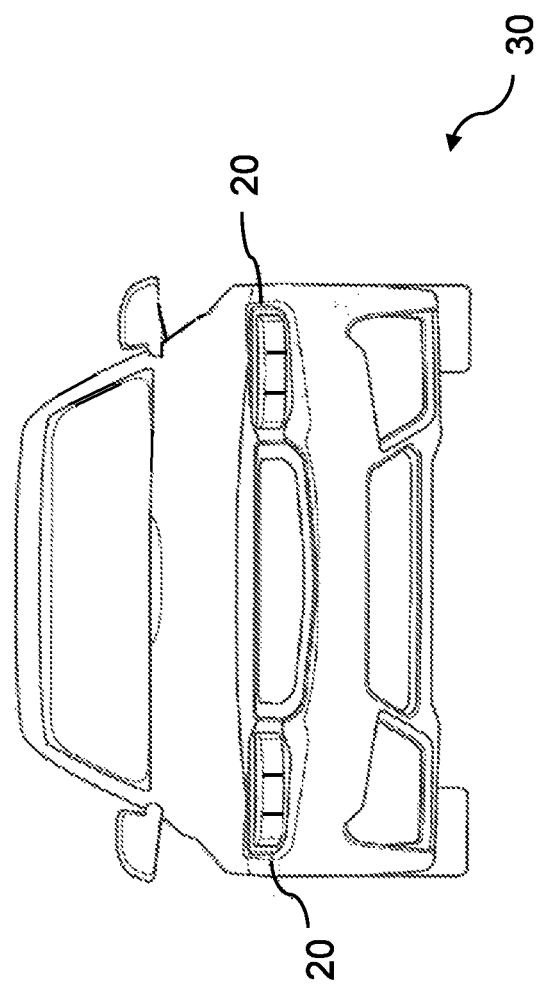
FIG. 5 is a schematic representation of a motor vehicle with a headlamp, comprising an inventive coating structure.

FIG. 5 shows a schematic representation of a motor vehicle 30 with a headlamp 20 or two headlamps 20, each comprising an inventive coating structure 2.

The coating structure 2 fashioned according to the invention makes it possible in particular by using the coating structure 2 in the reflector of a headlamp 20 to increase in a simple and cost-effective manner the light intensity achievable by means of a headlamp 20.

LIST OF REFERENCE NUMBERS

1 Inventive system
2 Coating structure
6 Substrate
8 Metallic base layer
10 Layer of polytetrafluoroethylene
20 Headlamp
30 Motor vehicle
100 Applying a metallic base layer to a substrate
200 Applying a layer of polytetrafluoroethylene to the metallic base layer
Applying a high-refractive index dielectric layer to the layer of
300 polytetrafluoroethylene
H High-refractive index dielectric layer
L Low-refractive index dielectric layer
R Reflectivity
A Wavelength

We claim:

1. A coating structure for coating a reflector for use in a headlamp of a motor vehicle, the coating structure comprising:
   a metallic base layer for application to a substrate;
   a layer of fluorocarbon arranged on the metallic base layer; and
   at least one high-refractive index dielectric layer (H) with a refractive index of ≥1.8 in the visible spectral range arranged on the layer of fluorocarbon,
   where the material of the high-refractive index dielectric layer (H) does not feature any absorption lines in the visible spectral range.

2. The coating structure in accordance with claim 1, wherein the metallic base layer is fashioned from aluminum, copper, silver or iron.

3. The coating structure in accordance with claim 1, wherein a plurality of high-refractive index dielectric layers (H) and a plurality of low-refractive index dielectric layers (L) with a refractive index of <1.8 in the visible spectral range of a material without absorption lines in the spectral range are arranged on the layer of fluorocarbon,
   where the high-refractive index dielectric layers (H) and the low-refractive index dielectric layers (L) are arranged on top of each other.

4. The coating structure of claim 3, wherein the where the high-refractive index dielectric layers (H) and the low-refractive index dielectric layers (L) alternate.

5. The coating structure in accordance with claim 1, wherein at least one high-refractive index dielectric layer (H) is a metal oxide.

6. The coating structure of claim 5, wherein the metal oxide of the at least one high-refractive index dielectric layer (H) is $TiO_2$ or $Fe_2O_3$.

7. The coating structure of claim 5, wherein the bonding layer is arranged on the metallic layer between the substrate and the metallic layer.

8. The coating structure in accordance with claim 1, wherein a low-refractive index layer (L) with a refractive index in the visible spectral range of <1.8 is fluorocarbon and/or hexamethyldisiloxane.

9. The coating structure in accordance with claim 1, further including a bonding layer for improving bonding, where the bonding layer is arranged on the metallic layer.

10. The coating structure in accordance with claim 1, wherein the coating structure features a reflectivity in the visible spectral range of >94%.

11. The coating structure in accordance with claim 1, wherein the layer thickness of the dielectric layers (H, L) is between 10 and 300 nm.

12. The coating structure in accordance with claim 1, wherein the layer thickness of the dielectric layers (H, L) differ at least partially from each other, where the layer thickness of the high-refractive index dielectric layer (H) is less than the layer thickness of the low-refractive index dielectric layer (L).

13. The coating structure in accordance with claim 1, wherein the coating structure is manufactured at least partially by a vapor deposition method.

14. A system comprising a substrate and a coating structure in accordance with claim 1 which is arranged on the substrate.

15. A reflector for use in a headlamp of a motor vehicle, the headlamp comprising a coating structure in accordance with claim 1.

16. A motor vehicle with a headlamp, the headlamp including a reflector comprising a substrate and a coating structure in accordance with claim 1 which is arranged on the substrate.

17. A method of producing a coating structure comprising the steps:
   applying a metallic base layer to a substrate,
   applying a layer of fluorocarbon to the metallic base layer,
   applying a high-refractive index dielectric layer with a refractive index of ≥1.8 in the visible spectral range of a material without absorption lines in the visible spectral range to the layer of fluorocarbon.

18. The method in accordance with claim 17, wherein the applying steps of the metallic base layer and/or the layer of fluorocarbon and/or the high-refractive index dielectric layer is/are performed by a vapor deposition method.

19. The method of claim 18, wherein the vapor deposition method is a PVD or CVD method.

* * * * *